US006339776B2

(12) United States Patent
Dayani-Fard et al.

(10) Patent No.: US 6,339,776 B2
(45) Date of Patent: Jan. 15, 2002

(54) DYNAMIC SEMI-STRUCTURED REPOSITORY FOR MINING SOFTWARE AND SOFTWARE-RELATED INFORMATION

(75) Inventors: Homayoun Dayani-Fard, Toronto; Igor Jurisica, Richmond Hill, both of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,998

(22) Filed: Oct. 4, 1999

(51) Int. Cl.[7] .............................................. G06F 17/30
(52) U.S. Cl. ............................... 707/102; 707/2; 707/3; 707/6; 707/5; 707/104; 717/4
(58) Field of Search .......................... 717/1–11; 707/2, 707/3, 5, 102, 104, 6; 395/708; 705/26–27

(56) References Cited

U.S. PATENT DOCUMENTS

| | | | | |
|---|---|---|---|---|
| 5,592,668 A | * | 1/1997 | Harding et al. | 707/2 |
| 5,862,382 A | * | 1/1999 | Kataoka | 395/708 |
| 5,913,214 A | * | 6/1999 | Madnick et al. | 707/10 |
| 5,960,425 A | * | 9/1999 | Buneman et al. | 707/3 |
| 5,978,790 A | * | 11/1999 | Buneman et al. | 707/2 |
| 5,999,938 A | * | 12/1999 | Bliss et al. | 707/102 |
| 6,076,087 A | * | 6/2000 | Suciu | 707/3 |

* cited by examiner

Primary Examiner—Jean M. Corrielus
(74) Attorney, Agent, or Firm—F. Chau & Associates, LLP

(57) ABSTRACT

A repository-based reverse engineering system for software systems and particularly legacy software systems. The reverse engineering system includes a graph-based data repository which holds data extracted from the source code in the software system. The graph-based data repository holds the data in a semi-structured form. The reverse engineering system includes mechanisms for constructing views on top of the extracted data and mechanisms for creating model abstractions on top of the views. The graph-based data repository provides flexible search and browse capabilities including pattern matching, structural searching, fuzzy and incomplete searching, and similarity-based searching. The system further includes an interface facility for external tools. The repository-based reverse engineering system enables integration of heterogeneous information sources, integration of external visualization and analytical tools, and searching and browsing facilities.

28 Claims, 2 Drawing Sheets

DYNAMIC SEMI-STRUCTURED REPOSITORY FOR MINING SOFTWARE AND SOFTWARE-RELATED INFORMATION

FIELD OF THE INVENTION

The present invention relates to computer aided software engineering and more particularly to a dynamic and semi-structured repository for reverse engineering software systems.

BACKGROUND OF THE INVENTION

Software systems are business assets, and typically critical assets. Existing software systems have become increasingly larger and more complex with lifetimes that are much longer than planned. Systems, as a whole, continually change. These changes, in turn, must propagate to all subsystems including software systems. Changes in a software system can be due to changes in the requirement specification, for example a change in government regulations, or as a result of changes in the operating environment, for example a change in the operating system. Other common changes can be corrective and in response to the detection of "bugs". Software systems are called legacy systems when they are mature, large in size, complex, and their documentation is limited. Generally such systems are business assets that cannot be replaced or retired easily. The existence of a large number of legacy systems has generated interest in building computer software tools that help understand the architecture and functionality of these systems.

The issue of change in software systems is often addressed under the title of maintenance or evolution. It is well known that software maintenance is both critical and time consuming. Reports of software maintenance research suggest that a large portion of the software life cycle (50% to 90%) is invested in maintenance.

A primary difficulty in maintaining software is coming to an understanding of the underlying source code. Software maintenance engineers are generally different than original designers, who are in most cases no longer available. Furthermore, many companies assign their newly hired programmers to the task of maintenance of software systems. The main source of understanding, in such cases, is the internal documentation which was prepared for the software. Software documentation is generally incomplete, outdated, or simply non-existent. Under the competitive pressures of today's software industry, documenting programs is considered secondary and often treated as an afterthought. In cases where documentation is available and up-to-date, it still may provide little help since it is often written text, augmented with sketches that provide only one view of the software system. Thus, a large portion of maintenance time is spent on understanding the software system by investigating the actual source code and talking to programmers with more expertise (i.e., mentoring).

The problem of maintenance is exacerbated by the short turn around time of software professionals: on average two to three years. Programmers either change projects, take promotions, or move for employment elsewhere. The combination of program understanding difficulties and short turnaround time of programmers has resulted in higher costs of training and, in turn, higher costs for maintaining the software systems.

The proposed solution to the problems of maintaining existing software systems involves the use of reverse engineering techniques.

Reverse engineering is the process of understanding how an existing software system works. This process involves extracting data about the software system and creating higher-level abstractions that simplify understanding of the system. In simple terms, reverse engineering involves mapping of the existing software artifact to a design specification and from there to a system specification. The mapping from specification to an implementation is one to many. Based on the knowledge of programming and the application domain, high-level abstractions are constructed. These abstractions represent different views of the system that capture only some essential properties of the software system. Some aspects of reverse engineering, such as data extraction, can be automated, while others cannot. It will be appreciated that reverse engineering even with the development of various reverse engineering tools remains a semi-automated process, which requires the involvement of human programmers.

Known reverse engineering tools provide support in the processes of extraction, analysis, and understanding of complex software systems during maintenance and evolution. Typically these tool sets include processes for parsing source code, grouping and filtering of the parsed code, representing derived information in textual and/or graphic forms, and browsing.

The Refine/C™ utility is a known extensible workbench for reverse engineering of existing C programs. The Refine/C™ utility provides a C parser and a lexical analyzer and APIs for building customized analysis tools. The Rigi™ program, which arose out of research at the University of Victoria, is another reverse engineering tool which is based on a graphical editor called rigiedit. The Rigi™ tool provides support for partial parsing of programs written in C, C++, PL/I, and COBOL. The Rigi™ tool also provides browsing and editing facilities for entities generated by parsing the source code.

The Imagix 4D™ program is a reverse engineering tool for C and C++ programs from the Imagix Corporation. The Imagix 4D™ program provides parsing facilities for C and C++ programs as well as views of the program at different levels of abstractions. These views are presented in a 3D format that allows the user to focus on those of immediate interest.

Also of note are tools that were developed for the purpose of architectural discovery. An example of such a tool is the Dali™ program, which was developed by Software Engineering Institute. The Dali™ program is a combination of various tools. It uses existing parsers for extracting information, a relational database for storing the extracted information, and Rigi™ for viewing and editing the extracted information. Each of the tools mentioned here has been applied to moderate sized software systems with some success.

In view of the foregoing, it will be appreciated that reverse engineering inherently is an ill-defined problem due to the difference in levels of expertise of the programmers. As a result, the process of reverse engineering has been characterized as exploratory. Many approaches have been put forward for reverse engineering, each with a varying degree of success in industrial settings. These approaches typically use one or more cognitive models of program understanding and support the reverse engineering process by providing a number of tools for extraction, analysis, visualization, and manual editing and browsing. In other words, all these approaches are tool-based. Unfortunately, reverse engineering is a time consuming endeavour. It typically takes months before a model of the software system being investigated is constructed, and these models are often inadequate in a number of ways. First, owners of software systems generally do not have an ability to generate and investigate models of the existing software system. The models are mostly constructed by using specific tools and the creation of new models requires the construction of new tools or the modification of existing ones. Second, searching capabilities are limited. In some cases, relational databases are used for intermediate storage of extracted information. Relational databases provide efficient facilities for querying databases. However, these relational databases are generally not suitable for interactive query of software repositories. As a result, relational databases are usually used during early stages for "off-line" querying. Once the higher-level abstractions are constructed, the relational database is no longer used. Thus, we need a combination of database and knowledge base technologies. Third, most conventional reverse engineering tools lack history and replay mechanisms. The process or reverse engineering, in other words, is once again in the minds of those involved in the initial process. Fourth, reverse engineering tools are centered around parsing engines. These tools rarely provide partial or incremental parsing, and as a result they are generally weak in incremental model building and reasoning in the presence of incomplete and unresolved references. Fifth, the tool-centric views of reverse engineering approaches do not provide sufficient support for integrating external tools.

The increase in size and complexity of software systems combined with their long lifetime has shifted the focus from design to maintenance and evolution. A key issue in maintaining legacy software systems is to understand them. Understanding large software systems involves abstracting away nonessential details and focussing on what is needed for the task at hand. For example, if changes in a software specification require integrating a new subsystem, it may only be necessary to understand the interfaces for the software system as opposed to details of the entire system.

Current reverse engineering technologies focus mainly on ad hoc tools that are designed for specific tasks: construction of data-flow graphs, control-flow graphs, call graphs, etc. The information captured by these tools, and the knowledge invested in construction of them are not readily usable by other systems. Further, software systems, as well as the personnel involved in maintaining them, continually change. There must be a way to understand software systems that can respond to continuous change. The challenge is to build tools that support knowledge interchange and work in dynamic environments.

Accordingly, in view of the shortcomings associated with existing reverse engineering techniques there still remains a need in the art. The present invention provides a repository-based system for reverse engineering software, particularly legacy software systems. The repository-based system according to the invention provides mechanisms for incremental building of models of the software system, filtering, grouping, manual manipulation, navigation and querying of software systems as well as history and replay facilities for recreation of models in lieu of changes to the software system. Advantageously, the repository mechanisms are useable with different programming languages and provide the capability for integrating external software tools.

BRIEF SUMMARY OF THE INVENTION

The present invention provides a repository-based system for reverse engineering software, and is particularly suited for legacy software systems.

The repository-based reverse engineering system according to the present invention combines database and knowledge base technologies which enable the user to capture historical information that is required for dealing with changes in the software system. The repository-based reverse engineering system provides the capability to store extracted data without enforcing a predetermined model, to make incremental updates to the extracted data, to capture knowledge about programming and the software system, to provide analysis tools for finding structure in the extracted data, to interface to external tools such as visualization tools, and to support export and import of information. The repository-based reverse engineering system complements existing technologies for data extraction, analysis, and visualization by providing uniform access to the data extracted from the software system and abstract models build from this data. Furthermore, historical data, in the form of records of operations of the data, would provide insight into the data extraction, generation of models, and the results of previous analyses performed on the software system.

The repository-based reverse engineering system features a software information infrastructure for managing the reverse engineering of computer programs in software systems. The repository-based reverse engineering system provides the capability to integrate heterogeneous information sources, to integrate external visualization and analytical tools, and to integrate search and browsing utilities. Advantageously, the storage of semi-structured information in the repository supports highly-evolving data management.

The repository-based reverse engineering system includes the following features: a mechanism for flexible graph-based storage of information; and mechanisms for creating multiple levels of information abstractions. The repository-based system includes scalability support through connection to a conventional relational database such as DB2™. The repository-based system also features a flexible search and browse facility for heterogeneous data sources based on pattern matching, structural searching, fuzzy and incomplete searching, and similarity-based searching.

In one embodiment, the repository-based reverse engineering system according to the present invention is implemented in the known Java™ programming language. In another embodiment, XML is the specification language for the repository-based reverse engineering system.

In a first aspect, the present invention provides a system for reverse engineering a computer program, the system includes: (a) means for extracting information related to source code in the computer program; (b) means for storing the extracted information in a semi-structured form; (c) means for creating a plurality of representations of the semi-structured information; and (d) means for updating the semi-structured information.

In another aspect, the present invention provides a method for reverse engineering a computer program, the method comprising the steps of: (a) extracting information related to source code in the computer program; (b) storing the extracted information in a semi-structured form; (c) creating a plurality of representations of the semi-structured information, wherein the representations provide means for analyzing the source code.

In yet another aspect, the present invention provides a Data storage media recorded with a computer program which, in combination with a general purpose computer configured for a system for reverse engineering a legacy computer program and said computer being equipped to read into memory and execute program data from the data storage media, constituting a method in accordance with the present invention.

BRIEF DESCRIPTION OF THE DRAWINGS

Reference will now be made to the accompanying drawings which show, by way of example, preferred embodiments of the present invention, and in which.

DETAILED DESCRIPTION OF THE PREFERRED EMBODIMENTS

The present invention provides a dynamic semi-structured repository-based system for reverse engineering computer software and legacy systems. As will be described in more detail, the repository-based reverse engineering system utilizes data mining and knowledge discovery in the reverse engineering process. Both activities of data mining and knowledge discovery involve extracting data from software systems, analysis of the extracted data, and deriving new knowledge from existing data or knowledge. The repository-based system provides a mechanism, i.e., an infrastructure, for managing information about a software system, including information storage, retrieval, manipulation, analysis and organization of heterogeneous data. The repository-based reverse engineering system comprises a semi-structured approach based on a graph representation and manipulation to provide flexibility.

Figure 1:
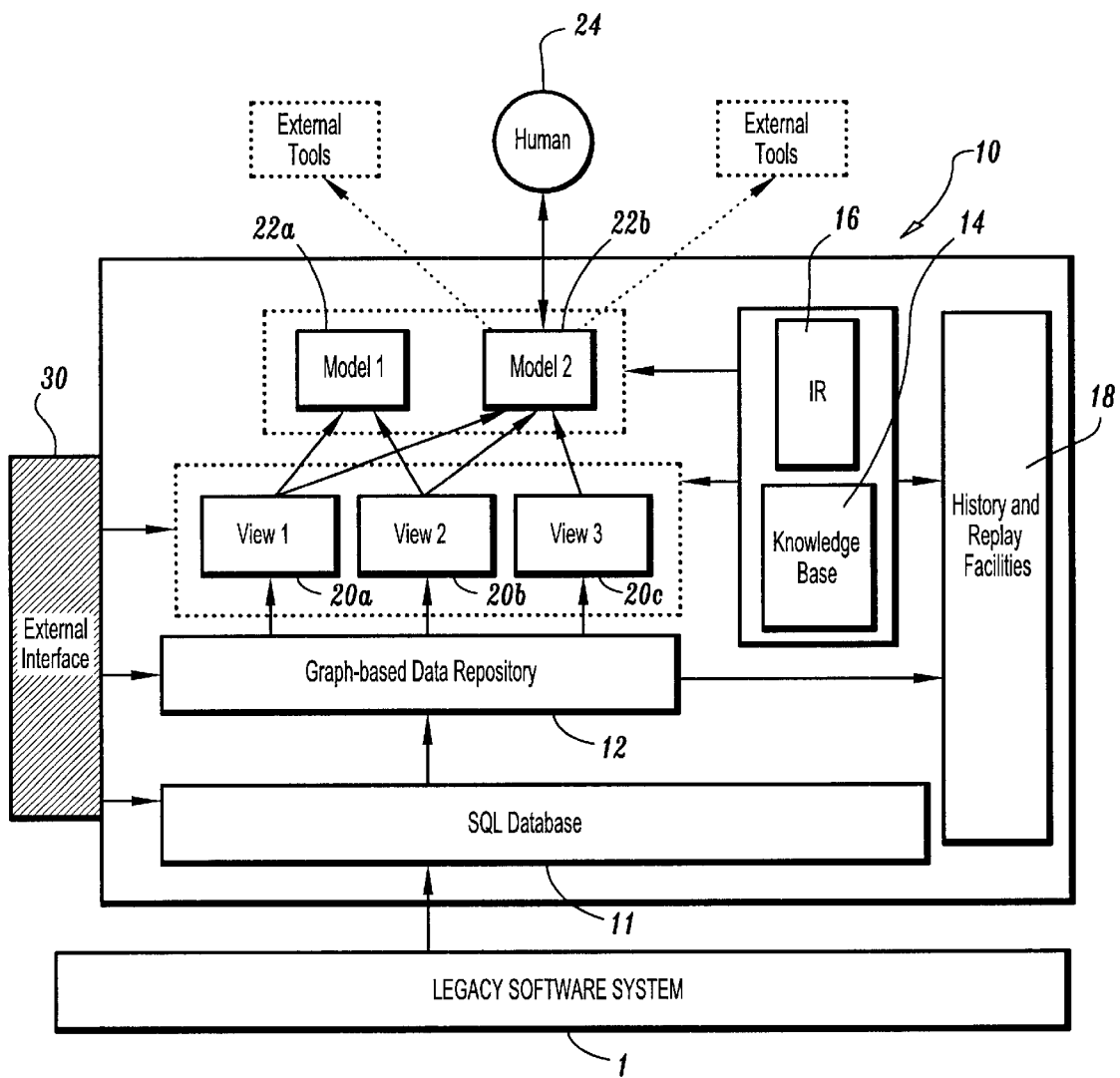
FIG. 1 which shows in block diagram form a repository-based reverse engineering system for software systems according to the present invention.

Reference is made to FIG. 1 which shows a repository-based reverse engineering system according to the present invention for reverse engineering a software or legacy software system 1. The repository-based reverse engineering system 10 is indicated generally by 10. As shown in FIG. 1, the repository-based reverse engineering system 10 comprises a relational database 11, a graph-based repository 12, a knowledge base subsystem 14, an information retrieval subsystem 16, and a history and replay facility module 18.

The relational database 11 is intended primarily for long-term storage of extracted data from the software system 1 that provides access control as well as rudimentary query system. The relational database 11 may be implemented using a conventional product such as DB2™ from IBM. The graph-based repository 12 is a dynamic materialization of a portion of the relational database 11 that may be needed for understanding of the software system 1. The graph-based repository 12 comprises a complete graph-based view of the underlying database 11 or a projection of the database 11 based on a series of queries. The graph-based representation provides an extension of the underlying relational database 11 and is used to abstract information in order to create dynamic views and models of the software system 1. As shown in FIG. 1, multiple views 20, shown individually as 20a, 20b and 20c, of the graph-based data repository 12 can be constructed using a conventional graph query system as will be within the understanding of one skilled in the art. The views 20 are purely syntactic and present simple abstractions of the graph-based data repository 12 on the generating query.

In the repository-based reverse engineering system 10, the information retrieval subsystem 16, and the knowledge base subsystem 14 provide assistance in the refinement of the views 20 into abstract models 22. The models 22 are shown individually as Model 1 (22a) and Model 2 (22b) in FIG. 1. The information retrieval subsystem 16 captures the vocabulary of the graph-based data repository 12, and provides a thesaurus, and idioms of the software system 1 being investigated. The knowledge base subsystem 14 captures semantic information about programming in general, the application domain, and the software system 1 being analyzed. It will be appreciated that the knowledge base subsystem 14 complements the syntactic information of the information retrieval subsystem 16. The notion of vocabulary and idioms have been investigated predominantly in the field of automatic programming as will be understood by those skilled in the art.

A human user utilizes the generated views 20 to construct the abstract models 22, i.e. higher-level abstractions. It will be appreciated that the models 22 or abstractions are refinements of the views 20 and are based on input 24 from the human user, the information retrieval subsystem 16, and the knowledge base subsystem 14. The models 22 can be further analyzed using external tools 26, shown individually as 26a and 26b in FIG. 1. For example, the external tool 26a may comprise a visualizing tool for manually editing the model 22b. The actions of the repository-based reverse engineering system 10 are recorded by the history and replay facility module 18 and are replayed to show the construction process of the models 22. The information captured in the history and replay facility module 18 may be used for evaluation of the evolution of the legacy software system 1 and also for reconstruction of the user-defined views 20. For example, a change in the database 11 must propagate through the graph-based data repository 12, the views 20, and the abstract models 22 that have been created from the database 11. It will be appreciated that such a feature is very useful since there will typically be a series of changes in the software system 1 and a user's understanding of the system 1 must reflect these changes.

The repository-based reverse engineering system 10 includes an external interface 30. The external interface 30 provides external tools with direct access to the relational database 11 through SQL queries, to the graph-based data repository 12 through the graph query language provided by the repository, and public application program interfaces or APIs. The external interfaces 30 provide flexibility to users to integrate their preferred tools with the repository-based system 10.

In terms of implementation, according to one embodiment, the repository-based reverse engineering system 10 is implemented in the well-known Java™ programming language. This allows advantage to be taken of Web (i.e. Internet) technology. For the Java™ implementation, information for the source code in the legacy software system 1 is extracted using the javap utility in the Java language. For example, information about files and directory structures can be extracted using shell scripts as will be within the understanding of one skilled in the art. Shell scripts are then used to construct the graph-based data repository 12. Other types of information, such as author names, are then manually annotated to the data repository 12. In another embodiment, the repository-based system 10 uses XML for data transfer.

According to one embodiment of the invention, the graph-based data repository 12 is implemented with an edge-labelled tree, similar to that found in a UNIX directory structure. In the edge-labelled tree, each arc has a unique ID, a label, and a set of attributes. The labels are strings of characters and need not be unique. The ID uniquely identifies an arc in the tree. The attribute set provides facilities for storing information about an arc. Nodes in the tree connect arcs in the tree, and contain no information except a reference to outgoing arcs. The repository 10 also preferably includes a table of all labels in the tree with references to their corresponding arcs.

Figure 2:
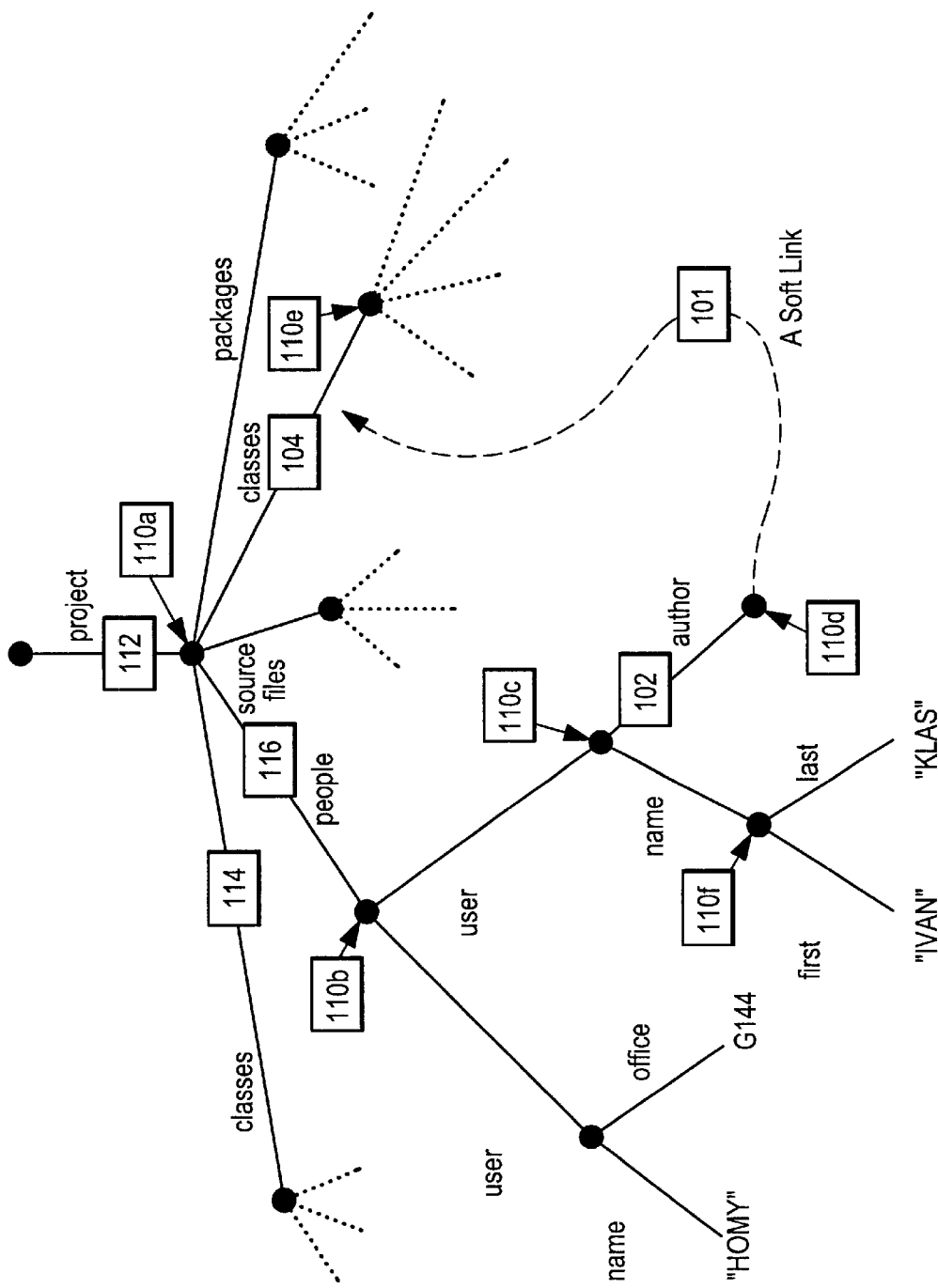
FIG. 2 shows in diagrammatic form an edge-labelled tree for the repository-based system according to the present invention.

The graph-based data repository 12 supports soft links which allows arcs to connect different sub-trees in the tree. Using soft links allows the creation of cycles in the graph-based data repository 12. Reference is made to FIG. 2 which shows a portion of an edge-labelled tree 100 for a graph-based data repository 12 in accordance with the present invention. The tree 100 includes a soft link 101. As shown in FIG. 2, the soft link 101 links an arc 102 with the label "author" (on the left side of the tree 100) to an arc 104 with the label "classes" (i.e. on the right side of the tree 100). In the tree 100, leaf nodes 110, shown individually as 110a, 110b, 100c, 110d, 110f, . . . , may comprise simple values such as a number or a string. The value stored at a node 110 may be interpreted by other tools, for example, as file names, offsets into a file, etc.

According to this aspect, the graph-based data repository 12 provides facilities for constructing, adding, and deleting information. The query engine integrated with the repository 12 provides both navigation and searching of the tree 100 using arc labels. Searching can be performed either on the entire structure, including the soft links (e.g. 101), or only on the tree portion 100 of the structure. If the searching includes soft links, then the query system utilizes a cycle detection mechanism. A query on the data repository 12 is implemented as a search for a given path string, where a path string is a sequence of labels. For example, the query for "project/classes" identifies all paths from the root of the tree 100 with a first arc 112 having the label "project" and a second arc having the label "classes". In the tree 100, there are two such paths: the arc 104 and arc 114.

To simplify query expressions and make navigation easier, the repository-based system 10 preferably includes a bookmarking facility. In known manner, a bookmark provides a relative point of reference for query paths. For example, if the arc 116 labelled "people" is bookmarked, then queries relative to this bookmark can be performed. In this case, the query "user/author" expresses all paths from the bookmark "people" with labels "user" and "author".

In addition, the following types of queries can be performed with the tree 100 shown in FIG. 2: a simple query, a simple query with wild card labels, and a regular expression query. The simple query specifies a set of paths in the tree 100 that match a given sequence of labels. For example, the query "project/people/user" results in two paths from the root to arcs labelled "user" through the sequence of arcs labelled "project" and "people". The simple query with wild card labels extends the sequence of labels with the use of wild characters such as "*" (zero or more characters), "?" (one character), or "+" (one or more characters). For example, the result of the query "project/peo*/user" is identical to the simple query "project/people/user" as described above. The regular expression query allows a wild character to be used for a number of labels. The character "*" refers to zero or more levels with any labels. The character "?" refers to one level with any label, and the character "+" refers to one or more levels of any label. For example, the result of the query "project/people/*/name" is all paths from the root to arcs labelled "name" such that the first two levels are labelled "project" and "people" respectively.

It will be appreciated that the graph-based data repository 12 according to this aspect of the invention provides a simple and unstructured mechanism for storing information about the software system 1. The information can be incrementally added to the repository and a history of the operations performed can be recorded or logged in the history and replay facilities module 18. Furthermore, conventional syntactic query tools allow for further exploration of the graph-based data repository 12. The repository-based system 10 also keeps a dictionary in the information retrieval subsystem 16 of all labels in the data repository 12 that can possibly be used by external information retrieval tools.

In summary, the repository-based reverse engineering system 10 according to the present invention preferably includes the following features: support for the storage of large volumes of data gathered from various types of sources using various extraction tools; support for incremental building and updating of models; fast and reliable query facilities that can be used for manipulation of the data; facilities for representing software and programming knowledge that can be used for constructions of high-level query facilities; facilities by which users can define "metrics" (i.e. quantitative measures) on the data store; history and replay mechanisms that can be used for re-creation of user defined views; well-defined interfaces by which external tools can communicate with the repository.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

The embodiments of the invention in which an exclusive property or privilege is claimed are defined as follows:

1. A reverse engineering system for reverse engineering a software system, said reverse engineering system comprising:
   (a) means for extracting information related to said software system;
   (b) means for constructing semi-structured forms of said extracted information based on syntax of said extracted information, wherein said constructed semi-structured forms are constructed views of said extracted information; and
   (c) means for deriving representations of said constructed semi-structured forms based on semantics of said extracted information, wherein said derived representations are abstract models of said constructed views.

2. The reverse engineering system of claim 1 further comprising means for updating said constructed semi-structured forms.

3. The reverse engineering system of claim 2 further comprising means for updating said derived representations.

4. The reverse engineering system as claimed in claim 3 further including:
   relational database means for storing said extracted information; and
   relational query means for querying said extracted information being stored in said relational database means.

5. The reverse engineering system as claimed in claim 3 further including an interface for interfacing external tools to provide access to said extracted information.

6. The reverse engineering system as claimed in claim 5 further including a knowledge subsystem for storing definitional data related to said extracted information.

7. The reverse engineering system as claimed in claim 6 further including a trace and replay subsystem for tracing and replaying operations associated with said extracted information.

8. The reverse engineering system as claimed in claim 6 further including an information retrieval subsystem comprising a dictionary of labels for use by external information retrieval systems.

9. The reverse engineering system of claim 1 wherein said software system comprises:
   program source code files each written in a programming language; and
   description files for describing aspects of said program source code files.

10. The reverse engineering system of claim 9 wherein said description files include change history data of said program source code files.

11. The reverse engineering system as claimed in claim 10 wherein said means for constructing semi-structured forms comprises a graph-based data repository.

12. The reverse engineering system as claimed in claim 11 further including means for searching said graph-based data repository.

13. The reverse engineering system as claimed in claim 12 wherein said means for searching includes means for performing a regular expression search on said graph-based data repository.

14. The reverse engineering system as claimed in claim 13 wherein said means for searching further includes means for performing similarity-based retrieval searches on said graph-based data repository.

15. The reverse engineering system as claimed in claim 11 wherein said abstract models comprise one or more views of said extracted information being contained in said graph-based data repository.

16. The reverse engineering system as claimed in claim 15 further including means for creating another level of abstract models on top of said views.

17. A method for reverse engineering a software system, said method comprising the steps of:
   (a) extracting information related to said software system;
   (b) constructing semi-structured forms of said extracted information based on syntax of said extracted information, wherein said constructed semi-structured forms are constructed views of said extracted information; and
   (c) deriving representations of said constructed semi-structured forms based on semantics of said extracted information, wherein said derived representations are abstract models of said constructed views.

18. The method of claim 17 further comprising the step of updating said constructed representations.

19. The method of claim 18 further comprising the step of updating said derived representations.

20. The method of claim 17 wherein said software system comprises:
   program source code files each written in a programming language; and
   description files for describing aspects of said program source code files.

21. The method of claim 20 wherein said description files include change history data of said program source code files.

22. The method as claimed in claim 21 wherein said step of constructing semi-structured forms comprises a graph-based data repository.

23. The method as claimed in claim 22 further including the step of searching said graph-based repository, said step of searching including performing a regular expression search or similarity-based search.

24. The method as claimed in claim 23 wherein said step of deriving representations comprises constructing one or more views of constructed semi-structured forms contained in said graph-based data repository.

25. The method as claimed in claim 21 further including the step of constructing said semi-structured forms in a relational database.

26. The method as claimed in claim 25 further including the step of performing relational queries on said extracted information contained in said relational database.

27. The method as claimed in claim 26 further including the step of extracting information from said relational queries and storing said extracted information of said relational queries in said graph-based repository.

28. Data storage media recorded with a computer program which, in combination with a general purpose computer configured for a system for reverse engineering a software system, said computer being equipped to read into memory and execute program data from the data storage media, constituting a method in accordance with any of claims 17 to 19, and 20 to 27.

* * * * *